United States Patent Office 3,030,336
Patented Apr. 17, 1962

3,030,336
EPOXYPOLYBUTADIENE POLYMERS
Frank P. Greenspan, Larchmont, and Anthony E. Pepe, Buffalo, N.Y., assignors to FMC Corporation, a corporation of Delaware
No Drawing. Filed Jan. 29, 1959, Ser. No. 789,809
12 Claims. (Cl. 260—47)

This invention relates to novel polymers, and particularly to new and improved epoxypolybutadiene polymers having enhanced utility.

It has long been known that butadiene may be polymerized to form low molecular weight, liquid polymers containing residual unsaturation. It is also known that these liquid polybutadienes may be epoxidized, to form products wherein at least some of the unsaturated linkages in the polymer are converted to oxirane groups. The epoxypolybutadienes thus produced are useful components of synthetic resins, and may be cured by reacting with polyfunctional agents such as polyamines and polycarboxylic acid anhydrides. The products are cross-linked resins useful as coatings, laminating and casting compounds, and in many other uses. They are of particular interest for their good electrical properties and flexibiliy.

The characteristics of the cured epoxypolybutadienes depend in large measure on the properties of the epoxypolybutadiene itself. To achieve a high degree of crosslinking, an epoxypolybutadiene of high epoxy content is preferred. Because of the difficulties encountered heretofore in preparing epoxypolybutadienes of high epoxy content, in practice an epoxypolybutadiene containing over about 7% by weight of epoxy oxygen is considered to have a high epoxy content. Since the viscosity of epoxypolybutadiene increases as the epoxy content increases, heretofore epoxybutadienes of high epoxy content, even those of very low molecular weight, have been exceedingly viscous and difficult to handle, and of limited utility in applications such as moldings or castings where solvents or reactive diluents are not conveniently used to reduce the viscosity. Another disadvantage has been the high hydroxyl formation which frequently accompanies attempts to increase the epoxy content. These disadvantages have limited the degree of epoxidation that has been employed in practice, in order to produce epoxypolybutadienes of maximum utility.

There has been a continuing need for an epoxypolybutadiene of high epoxy content and low viscosity. Heretofore it had been believed that high epoxy content in epoxypolybutadienes necessarily was accompanied by very high viscosity. We have now discovered that epoxypolybutadienes of high epoxy content yet of much lower viscosity than previously available may be prepared.

The novel epoxypolybutadienes of this invention not only are of greatly enhanced utility because of their low viscosity, but they offer several additional and unexpected advantages. For example, the high epoxy content is readily obtained under mild conditions. Also, these epoxypolybutadienes are much more stable under the acidic reaction conditions than are the epoxypolybutadienes heretofore used, thus minimizing the increase in hydroxyl content which has heretofore accompanied increased epoxy content.

These epoxypolybutadienes are readily cured by reacting with polyfunctional active hydrogen compounds, such as polyamines, polybasic acids and anhydrides, polyols, polymercaptans and polyphenols. With certain curing agents, such as polyamines, they exhibit enhanced reactivity over epoxypolybutadienes of the prior art including epoxypolybutadienes of the same epoxy content; curing is effected much more rapidly and under much milder conditions, and the mechanical properties of the cured epoxypolybutadienes are substantially improved.

The products of this invention are prepared from liquid polymers of butadiene. Butadiene has been polymerized to form liquid polymers in several ways, including emulsion or solution polymerization using a variety of catalysts, including free radical, alkali metal, Friedel-Crafts and organo-metallic catalysts. The liquid polybutadienes produced normally contain a substantial proportion of cyclic units and/or branched chains, due to intromolecular reactions.

Polybutadienes may be further characterized by the nature of their residual unsaturation. The polymer is known to contain both external double bonds, due to terminal vinyl groups on the polymer molecule, and internal double bonds, based on cis and trans 1,4-addition of the monomer units. The reactivities of these external and internal double bonds in polybutadiene are known to differ. For example, on epoxidation of a liquid polybutadiene it was reported that there was complete reaction of the trans internal bonds, partial reaction of the cis internal bonds, and no reaction at all of the external double bonds. Liquid polybutadienes have been reported to contain an average of about 60% external (vinyl) double bonds and about 40% internal double bonds. These data are discussed in an article by Fitzgerald et al. in the Journal of the Society of Plastics Engineers, January 1957, pages 22–24.

Despite the reported lack of reactivity of the external double bonds in polybutadiene, we have found that polybutadienes having a high proportion of external double bonds, that is, over about 65% of the total unsaturation as vinyl groups, and having a substantially linear structure, have the surprising property of allowing substantially greater amounts of epoxy oxygen to be introduced than heretofore without the correspondingly large increases in viscosity that have been obtained in the past.

The epoxypolybutadienes thus obtained are characterized by a substantially linear structure, an epoxy oxygen content of about 7–11% by weight, a molecular weight of about 300–3000 and preferably in the range of about 500–1800, a melt viscosity of less than 10,000 poises and preferably in the range of about 25–5000 poises at 25° C. at zero shear, and an iodine number of about 100–250.

A useful method for producing a substantially linear low molecular weight polybutadiene, having a high ratio of external to internal double bonds, is to employ an alkali metal as the polymerization catalyst in the presence of a modifier such as dioxane. This procedure inhibits ring formation during the polymerization, and also affects the ratio of external to internal double bonds in the polymer. In general, a finely divided metal, of which sodium is preferred, is dispersed in an inert medium, the modifier is added and the monomer is fed slowly into the dispersion. Alternatively, the modifier and the monomer may be added together to the catalyst dispersion. The concentration of modifier used is preferably about 10–20% by weight of butadiene, although concentrations ranging from 1–100 weight percent may be used in order to prepare polymers having particular properties. Within the preferred modifier concentration range, over 65% of the polymer unsaturation is of the vinyl type. At less than 10% modifier this percentage is lowered, and at the same time the degree of cyclization in the polymer is increased.

The degree of polymerization is affected by the reaction conditions. In general, the higher the polymerization temperature, the lower the molecular weight of the product. When the reaction is completed, usually after 1–3 hours at 75–100° C., the catalyst is destroyed, conveniently by addition of an organic acid, and volatiles are stripped from the residual oily polymer to remove solvent, modifier and most of the very low molecular weight polymer.

The linear liquid polybutadienes produced are characterized by molecular weights in the range of about 250–2500 and preferably about 400–1500 as determined by intrinsic viscosity measurements, melt viscosities below about 50 poises and preferably in the range of about 5–25 poises at zero shear and 25° C., and iodine numbers in the range of about 350–450. The ratio of external to internal double bonds, is over about 1.9; that is, over about 65% of the unsaturation is of the vinyl type. From these polybutadienes, low viscosity epoxypolybutadienes having a high epoxy content are readily prepared.

In preparing the epoxypolybutadienes of this invention, standard epoxidation procedures may be employed. In a preferred procedure, the linear liquid polybutadiene is dissolved in a suitable solvent, such as heptane, benzene, chloroform, ethyl chloride or the like, usually in the presence of an acid catalyst, conveniently a cation exchange resin, and contacted with the epoxidizing agent. The epoxidizing agent may be a lower aliphatic peracid, such as performic, peracetic, perpropionic or perbutyric acid, and these are preferred for economy and ease of handling. Higher aliphatic peracids may also be used, as well as aromatic peracids such as perbenzoic. Salts of the peracids, or the hydroperoxides, are also effective oxidizing agents. Peracids may be prepared in any known way, such as is described in "Organic Syntheses," Coll. Vol. I, 2d Edition (John Wiley & Sons, 1941), p. 431, or in Richter's "Organic Chemistry," vol. I, p. 319. The epoxidation reaction may be carried out using a preformed epoxidizing agent, or the oxidant may be formed in situ. A convenient epoxidation procedure involves the addition of hydrogen peroxide to an aliphatic acid or anhydride medium, thus generating a peracid in situ.

The epoxidation reaction may be conducted using stoichiometric amounts of oxidizing agent, for example, one mole of hydrogen peroxide or peracid per double bond in the polymer; or amounts above or below that theoretically required may be used, to produce epoxypolybutadienes of specific epoxy content. Although the reactivities and properties of the epoxidized polybutadienes do vary with the degree of epoxidation, it has been found that the use of as little as 40% of the amount of oxidant theoretically required to react with all the double bonds in the polymer will produce resins of excellent properties. Decreasing the amount of oxidant from the stoichiometric amount has the general effect of decreasing both the epoxy content and the viscosity of the resin.

The epoxidation reaction of this invention may be carried out at a temperature in the range of about 0–95° C., the optimum conditions varying with the epoxidizing agent used. The time of reaction depends upon such factors as temperature and degree of epoxidation desired. The reaction usually requires about 3 to 15 hours for completion. In general, increasing the time of epoxidation at a given temperature increases the epoxy content of the product, although prolonged reaction at elevated temperatures may result in further reaction of the epoxy groups, for example with any acid or water which may be present. The extent of epoxidation may be readily determined by measuring the amount of unreacted oxidant in the mixture—for example, residual hydrogen peroxide is conveniently measured with ceric sulfate. The product is readily recovered by standard procedures, such as filtration from any solid, and evaporation of low-boiling materials under reduced pressure. A convenient procedure is to heat the reaction product for several hours at about 50–75° C. at 2–10 mm. Hg. In practice, it is not necessary to remove all volatile matter, and for specific uses, substantial amounts of low-boiling materials may be allowed to remain, since this has the effect of reducing the viscosity.

The epoxypolybutadienes thus produced have an epoxy oxygen content of about 7–11% by weight of polymer, controlled by the amount of oxidant used. At least about 25% of the epoxy groups are formed by epoxidation of the external (vinyl) double bonds in the polybutadiene used as starting material. The molecular weight is in the range of about 300–3000, and preferably about 500–1800. Since the melt viscosity of the epoxypolybutadiene increases with the epoxy content and the molecular weight of the polymer, for higher epoxy content products it is usually preferred to use polymers in the lower molecular weight range. Within these variables, epoxypolybutadienes having a melt viscosity of less than 10,000 poises, preferably in the range of about 250–5000 poises at zero shear and 25° C., are readily obtained. These viscosities are substantially lower than those of epoxypolybutadienes heretofore available, where similar epoxy contents are accompanied by much higher viscosities. The epoxypolybutadienes of this invention are further characterized by a low iodine number, as compared with prior epoxypolybutadienes of the same epoxy content.

These novel epoxypolybutadienes, when reacted with polyfunctional active hydrogen compounds, such as amines, acids or anhydrides, phenols, mercaptans, and the like, are cured to produce synthetic resins of superior mechanical and electrical properties, useful in laminates, as casting and molding compounds, and in many other applications.

This invention is illustrated further in the following examples, which include preferred procedures for the polymerization and epoxidation of polybutadiene, and specific illustrations of the curing of the epoxypolybutadienes produced. All parts are by weight.

*Example 1*

Butadiene was polymerized as follows: A dispersion of sodium in refined kerosene was prepared by agitating 900 parts of sodium, 900 parts of refined kerosene and 9 parts of the dimer of linoleic acid (dimer acid) for one hour at 105–110° C. in a homogenizer, to produce sodium particles of 2–10 microns in size. Eight parts of this 50% dispersion of sodium in kerosene and 200 parts of benzene were charged to a reactor. With agitation, the temperature was raised to 88° C., and 6.8 parts of technical grade butadiene containing tert.-butyl catechol as inhibitor was added. After 20 minutes the reaction started, and 93.2 parts of the butadiene and 20 parts of dioxane were metered continuously into the vessel, at a temperature of about 90° C. After a total of 1.4 hours the mixture was cooled to 50° C., and the catalyst was destroyed by addition of 29 parts of glacial acetic acid. The mixture was filtered through 34 parts of soda ash, and volatiles were removed at 50–65° C. at 0.5–2 mm. Hg. The residue was an oily polybutadiene, having a molecular weight of 860 based on an intrinsic viscosity of 0.084, an iodine number of 404, melt viscosity of 14.6 poises at zero shear and 25° C., and 72.2% vinyl unsaturation as determined by infra-red absorption spectra, corresponding to a ratio of external to internal double bonds of 2.6.

This polybutadiene was epoxidized as follows: About 100 parts of oily polybutadiene, 100 parts of toluene, 41.6 parts of Dowex Resin 50 X-8 (a sulfonated styrene-divinyl benzene copolymer cross-linked with 8% divinyl benzene), and 16.2 parts of glacial acetic acid were charged to a reaction flask. During stirring, about 70 parts of 50% hydrogen peroxide (61% of the theoretical amount) was added over a period of 55 minutes. Stirring was continued for a total of 18 hours at 60–65° C. The mixture was then cooled, filtered, neutralized with about 25 parts of sodium carbonate, and dried over anhydrous magnesium sulfate. After filtration, the solvent was removed by distillation at 60–70° C. at 2–10 mm. Hg, to leave a residue of epoxypolybutadiene having an epoxy content of 9.7%, hydroxyl content of 1.0%, an iodine number of 203 and melt viscosity of 3580 poises at 25° C. at zero shear.

For purposes of comparison, the above polymerization of butadiene was repeated, omitting the dioxane. The polybutadiene produced had a molecular weight of 660, based on an intrinsic viscosity of 0.062, an iodine number of 323, melt viscosity of 100 poises at zero shear at 25° C., and 58.3% vinyl unsaturation, or a ratio of external to internal double bonds of 1.4. On epoxidation as above, but reducing the amount of hydrogen peroxide to 46.5 parts of 50% hydrogen peroxide (50% of the theoretical amount) the epoxypolybutadiene produced had an epoxy content of 5.2%, iodine number of 197, and melt viscosity of 25,570 poises at 1 r.p.m. at 25° C. It is seen that, even at a much lower epoxy content and molecular weight, a very high viscosity epoxypolybutadiene was obtained.

*Example II*

Butadiene was polymerized and epoxidized as follows: Four parts of sodium as a 50% dispersion in kerosene, 10 parts of dioxane and 200 parts of benzene were charged to an agitated reactor. The temperature was raised to 89° C., and 7.0 parts of butadiene was added to the reactor. The reaction commenced almost immediately, and 92 parts of butadiene was added over a period of 1.8 hours, over a temperature range of 80-100° C. The mixture was then cooled to 50° C., and the catalyst destroyed by addition of 29 parts of glacial acetic acid. The mixture was filtered through sodium carbonate, and stripped of volatiles at 50-65° C. and 0.5-2 mm. Hg. The liquid polybutadiene obtained as residue exhibited an iodine number of 402, melt viscosity of 14.6 poises at 25° C. at zero shear, molecular weight of 1930 based on an intrinsic viscosity of 0.120, and 70.6% vinyl unsaturation, corresponding to a ratio of external to internal double bonds of 2.4.

About 100 parts of this polybutadiene, 100 parts of toluene, 41.6 parts of Dowex resin 50 X-8 and 20.3 parts of glacial acetic acid were charged to an agitated reaction flask. About 46.7 parts of 50% hydrogen peroxide (40% of the theoretical amount) was added over about one hour, and stirring was continued for about 6 hours at 60-65° C. The batch was filtered through fiber glass and neutralized with about 25 parts of sodium carbonate. After drying over magnesium sulfate, the mixture was filtered and the solvent distilled off at about 60-70° C., and 2-10 mm. Hg. The epoxypolybutadiene obtained as residue exhibited an epoxy content of 7.8%, an iodine number of 239, and a melt viscosity of 358 poises at 25° C. at zero shear.

*Example III*

Four parts of sodium as a 50% dispersion in kerosene and 200 parts of benzene were charged to an agitated reactor. The temperature was raised to 89° C. and 10 parts of butadiene was added. After an induction period of about five minutes, 90 parts of butadiene and 20 parts of dioxane were charged continuously to the reactor, at an average temperature of about 101° C. After 70 minutes the mixture was cooled to 50° C., and the catalyst destroyed by addition of 29 parts of glacial acetic acid. The mixture was filtered through sodium carbonate, and volatiles were removed at 50-65° C. and 0.5-2 mm. Hg. The residue was a liquid polybutadiene having an iodine number of 385, melt viscosity at zero shear of 15 poises at 25° C., average molecular weight of 220 based on an intrinsic viscosity of 0.03, and 69.8% vinyl unsaturation, corresponding to a ratio of external to internal double bonds of 2.2.

About 100 parts of this polybutadiene, 100 parts of benzene, 41.6 parts of Dowex resin 50 X-8 and 16.2 parts glacial acetic acid were charged to an agitated reaction flask. About 69.6 parts of 50% hydrogen peroxide (63% of the theoretical amount) was added to the mixture over 65 minutes. After 6.4 hours at 59° C. the mixture was filtered through fiber glass and neutralized with about 25 parts of sodium carbonate. After drying over magnesium sulfate the mixture was filtered, and volatiles were distilled at 60-70° C. and 2-10 mm. Hg. The epoxypolybutadiene residue displayed an epoxy content of 8.0%, an iodine number of 183, and a melt viscosity of 489 poises at zero shear at 25° C.

*Example IV*

Four parts of sodium as a 50% dispersion in kerosene and 200 parts of benzene were charged to an agitated reactor. The temperature was raised to 88° C. and 6.8 parts of butadiene was added. After about 10 minutes the reaction started, and 93.2 parts of butadiene and 10 parts of dioxane were charged continuously to the reactor. After 1.6 hours at a temperature of 85-93° C., the batch was cooled to 50° C. and the catalyst was destroyed by addition of 28 parts of glacial acetic acid. The mixture was filtered through sodium carbonate, and volatiles were removed at 50-65° C. and 0.5-2 mm. Hg. The polybutadiene residue had a melt viscosity of 14.6 poises at 25° C. at zero shear, an iodine number of 382, a molecular weight of 1070 based on an intrinsic viscosity of 0.084, and 71.4% vinyl unsaturation, corresponding to a ratio of external to internal double bonds of 2.4.

About 100 parts of this polybutadiene, 100 parts of toluene, 41.6 parts of Dowex resin 50 X-8 and 16.2 parts of glacial acetic acid were charged to an agitated reaction flask. About 69.6 parts of 50% hydrogen peroxide (64% of the theoretical amount) was added to the mixture over a period of 2.5 hours. After a total of 11.5 hours at 60-70° C., the mixture was filtered through fiber glass, and neutralized with about 25 parts of sodium carbonate. After drying over magnesium sulfate, the mixture was filtered and volatiles removed at 60-70° C. and 2-10 mm. Hg. The epoxypolybutadiene residue had an epoxy content of 9.1%, an iodine number of 153 and a melt viscosity of 2950 poises at 25° C. at zero shear.

*Example V*

About 4.3 parts of sodium as a 50% dispersion in kerosene and 162 parts of benzene were charged to an agitated vessel. The temperature of the ingredients was raised to 90° C., and about three parts of butadiene added. The reaction began almost immediately, and 97 parts of butadiene and 20 parts of dioxane were metered continuously into the reactor, at a temperature of about 85° C. After about 4 hours, the batch was cooled to 50° C., and 19 parts of glacial acetic acid was added. The mixture was filtered through sodium carbonate, and the filtrate was evaporated at 19-55° C. at an absolute pressure range of 23-57 mm. The liquid polybutadiene obtained as residue exhibited an iodine number of 383, molecular weight of 980, melt viscosity of 9 poises at 25° C. at zero shear, and a ratio of external to internal double bonds of 2.5.

About 100 parts of this polybutadiene, 100 parts of benzene, 41.6 parts of Dowex resin 50 X-12 (a sulfonated styrene-divinyl benzene cross-linked with 12% divinyl benzene) and 16.2 parts of glacial acetic acid were combined and heated with stirring to 60° C. About 70 parts of 50% hydrogen peroxide (64% of the theoretical amount) was added over a period of three hours. The temperature was maintained at 60° C. for an additional two hours, after which the mixture was cooled to 30°-35° C., mixed with 123 parts of benzene and 26 parts of soda ash, and allowed to settle. The oily layer was removed, and filtered through sodium carbonate. The filtrate was dried azeotropically, and volatiles were removed at 22-70° C. over a pressure range of 5-95 mm. The epoxypolybutadiene obtained as residue had an epoxy content of 8.5%, a hydroxyl content of 1.5%, an iodine number of 176, and a melt viscosity of 1060 poises at zero shear at 25° C.

Example VI

About 100 parts of dioxane-modified polybutadiene, having an iodine number of 370, a molecular weight of 1500, and 66.6% vinyl unsaturation, corresponding to a ratio of external to internal double bonds of 2.0, was dissolved in 100 parts of toluene. About 10 parts of sodium acetate was added. Then 146 parts of 40% peracetic acid (50% of the theoretical amount) was added to the ingredients at 40°–50° C. over a period of 1.25 hours. The reaction was continued for several hours at 40–50° C. The mixture was cooled, and washed with water until free of acid. The water layer was removed and the epoxypolybutadiene was dried over anhydrous magnesium sulfate and anhydrous sodium carbonate and filtered. The toluene was removed under reduced pressure, at a final temperature of 80° C. at 0.02 mm. Hg. The epoxypolybutadiene obtained as residue had a melt viscosity of 2200 poises at zero shear at 25° C., an epoxy content of 7.9% and an iodine number of 202.

Example VII

Curing with an anhydride is illustrated as follows: To 100 parts of the resin prepared in Example V was added 26 parts of maleic anhydride, which had been melted at 60° C. The components were blended, and cured by heating for 2 hours at 90° C. followed by 4 hours at 115° C. The product was a solid with the following properties:

| | |
|---|---|
| Flexural strength, p.s.i. | 10,100 |
| Flex modulus, p.s.i. | 340,000 |
| Elongation, percent (flexural) | 3.5 |
| Tensile strength, p.s.i. | 4,000 |
| Tensile modulus at 0 elong., p.s.i. | 100,000 |
| Elongation, percent (tensile) | 4 |
| Heat distortion temp., ° C. | |
| After postcure of 24 hrs. at 155° C. | 170 |

Example VIII

The epoxypolybutadiene resin prepared in Example V was cured with m-phenylenediamine as follows: Into 100 parts of the resin was blended 32 parts of m-phenylenediamine and 2 parts phenol, at 50° C. Air bubbles were eliminated by application of vacuum. The mixture was cooled to room temperature, then cured by heating at 150° C. for 4 hours. The product had the following properties:

| | |
|---|---|
| Flexural strength, p.s.i. | 16,000 |
| Flex modulus, p.s.i. | 390,000 |
| Elongation, percent (flexural) | 5.9 |
| Tensile strength, p.si. | 7,000 |
| Tensile modulus at 0 elong., p.s.i. | 145,000 |
| Elongation, percent (tensile) | 6.5 |
| Heat distortion temp., ° C. | 90 |
| After postcure of 24 hrs. at 155° C. | 108 |

From the foregoing description and illustrative examples, it is apparent that the novel process of this invention is susceptible to numerous modifications and variations within the scope of the disclosure, and it is intended to include such modifications and variations within the scope of the following claims.

We claim:

1. An epoxypolybutadiene polymer characterized by a substantially linear structure, an epoxy content of about 7–11% by weight of polymer, a molecular weight of about 300–3000, a melt viscosity less than about 10,000 poises at 25° C. at zero shear and an iodine number of about 100–250, and prepared by epoxidizing a liquid polybutadiene characterized by a substantially linear structure, a molecular weight of about 250–2500, a melt viscosity less than about 50 poises at 25° C. at zero shear, an iodine number of about 350–450, and over 65% of the unsaturation as vinyl groups.

2. An epoxypolybutadiene polymer characterized by a substantially linear structure, an epoxy oxygen content of about 7–11% by weight of polymer, a molecular weight of about 500–1800, a melt viscosity of about 250–5000 poises at 25° C. at zero shear and an iodine number of about 100–250, and prepared by epoxidizing a liquid polybutadiene characterized by a substantially linear structure, a molecular weight of about 400–1500, a melt viscosity of about 5–25 poises at 25° C. at zero shear, an iodine number of about 350–450, and over 65% of the unsaturation as vinyl groups.

3. The method of producing an epoxypolybutadiene polymer characterized by a substantially linear structure, an epoxy content of about 7–11% by weight of polymer, a molecular weight of about 300–3000, a melt viscosity less than about 10,000 poises at 25° C. at zero shear, and an iodine number of about 100–250, which comprises epoxidizing a liquid polybutadiene characterized by a substantially linear structure, a molecular weight of about 250–2500, a melt viscosity less than about 50 poises at 25° C. at zero shear, an iodine number of about 350–450, and over 65% of the unsaturation as vinyl groups, at a temperature of 0–95° C. for 3–15 hours.

4. A resinous composition comprising the reaction product of a polyfunctional active hydrogen curing agent with an epoxypolybutadiene polymer characterized by a substantially linear structure, an epoxy content of about 7–11% by weight of polymer, a molecular weight of about 300–3000, a melt viscosity less than about 10,000 poises at 25° C. at zero shear and an iodine number of about 100–250, and prepared by epoxidizing a liquid polybutadiene characterized by a substantially linear structure, a molecular weight of about 250–2500, a melt viscosity less than about 50 poises at 25° C. at zero shear, an iodine number of about 350–450, and over 65% of the unsaturation as vinyl groups.

5. The resinous composition of claim 4 in which the polyfunctional active hydrogen curing agent is a compound selected from the group consisting of polybasic carboxylic acids and anhydrides.

6. The resinous composition of claim 4 in which the polyfunctional active hydrogen curing agent is a polyamine.

7. The resinous composition of claim 4 in which the polyfunctional active hydrogen curing agent is a polyhydroxy compound.

8. The resinous composition of claim 4 in which the polyfunctional active hydrogen curing agent is a polymercaptan.

9. The resinous composition of claim 4 in which the polyfunctional active hydrogen curing agent is a polyphenol.

10. The method of producing an epoxypolybutadiene polymer characterized by a substantially linear structure, an epoxy content of about 7–11% by weight of polymer, a molecular weight of about 500–1800, a melt viscosity of about 250–5000 poises at 25° C. at zero shear, and an iodine number of about 100–250, which comprises epoxidizing a liquid polybutadiene characterized by a substantially linear structure, a molecular weight of about 400–1500, a melt viscosity of about 5–25 poises at 25° C. at zero shear, an iodine number of about 350–450, and over 65% of the unsaturation as vinyl groups, by reacting said polybutadiene with a lower aliphatic peracid at a temperature of 0–95° C. for 3–15 hours.

11. The method of claim 10, wherein said epoxidation comprises the step of reacting said liquid polybutadiene with at least about 40% of the stoichiometric amount of peracetic acid.

12. The method of producing an epoxypolybutadiene polymer characterized by a substantially linear structure, an epoxy content of about 7–11% by weight of polymer, a molecular weight of about 300–3000, a melt viscosity less than about 10,000 poises at 25° C. at zero shear, and an iodine number of about 100–250, which comprises epoxidizing a liquid polybutadiene characterized by a substantially linear structure, a molecular weight of about 250–2500, a melt viscosity less than about 50 poises at 25° C. at zero shear, an iodine number of about 350–450, and over 65% vinyl unsaturation by reacting said polybutadiene with at least about 40% of the stoichiometric amount of a lower aliphatic peracid, in the presence of a cation exchange resin, at a temperature of about 0° to 95° C. for a period of about 3 to 18 hours, and recovering the epoxypolybutadiene produced.

References Cited in the file of this patent

UNITED STATES PATENTS

| | | |
|---|---|---|
| 2,660,563 | Banes et al. | Nov. 24, 1953 |
| 2,826,566 | Greenspan | Mar. 11, 1958 |
| 2,829,135 | Greenspan et al. | Apr. 1, 1958 |
| 2,838,524 | Wilson | June 10, 1958 |
| 2,870,125 | Payne et al. | Jan. 20, 1959 |
| 2,876,214 | Wheelock et al. | Mar. 3, 1959 |
| 2,935,492 | Newey | May 3, 1960 |

OTHER REFERENCES

Gall et al.: Journal of The American Oil Chemist's Society, vol. 34, No. 4, pages 161–164 (1957).

Fitzgerald: Electronic Equipment, July 1956, pages 64–67.

UNITED STATES PATENT OFFICE
CERTIFICATE OF CORRECTION

Patent No. 3,030,336                 April 17, 1962

Frank P. Greenspan et al.

It is hereby certified that error appears in the above numbered patent requiring correction and that the said Letters Patent should read as corrected below.

Column 2, line 8, for "intromolecular" read -- intramolecular --; line 41, for "25-5000" read -- 250-5000 --.

Signed and sealed this 21st day of August 1962.

(SEAL)
Attest:

ESTON G. JOHNSON
Attesting Officer

DAVID L. LADD
Commissioner of Patents